United States Patent
Muto

(10) Patent No.: US 9,428,012 B2
(45) Date of Patent: Aug. 30, 2016

(54) TIRE

(75) Inventor: Shuhei Muto, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 790 days.

(21) Appl. No.: 13/145,197

(22) PCT Filed: Jan. 19, 2010

(86) PCT No.: PCT/JP2010/050524
§ 371 (c)(1),
(2), (4) Date: Aug. 30, 2011

(87) PCT Pub. No.: WO2010/084848
PCT Pub. Date: Jul. 29, 2010

(65) Prior Publication Data
US 2011/0303333 A1 Dec. 15, 2011

(30) Foreign Application Priority Data
Jan. 20, 2009 (JP) .................................. 2009-010116

(51) Int. Cl.
| | |
|---|---|
| *B60C 11/11* | (2006.01) |
| *B60C 11/117* | (2006.01) |
| *B60C 11/12* | (2006.01) |
| *B60C 11/13* | (2006.01) |
| *B60C 11/03* | (2006.01) |

(52) U.S. Cl.
CPC ............ *B60C 11/12* (2013.01); *B60C 11/0306* (2013.04); *B60C 2011/0388* (2013.04); *B60C 2011/1213* (2013.04); *B60C 2011/1254* (2013.04); *B60C 2011/1268* (2013.04)

(58) Field of Classification Search
CPC ... B60C 11/00; B60C 11/03; B60C 11/0306; B60C 11/0309; B60C 11/032; B60C 11/0327; B60C 11/11; B60C 11/12; B60C 11/1259; B60C 11/1272; B60C 11/13; B60C 11/1369
USPC ..................................................... 152/209.18
See application file for complete search history.

(56) References Cited

U.S. PATENT DOCUMENTS 3,637,001 A * 1/1972 Roberts et al. .......... 152/209.17
5,048,583 A * 9/1991 Goto et al. ............... 152/209.17
(Continued)

FOREIGN PATENT DOCUMENTS

| EP | 590916 | * | 4/1996 |
| EP | 1 923 234 A1 | | 5/2008 |
(Continued)

OTHER PUBLICATIONS

Machine translation of JP 6-247110, 1994.*
(Continued)

*Primary Examiner* — Justin Fischer
(74) *Attorney, Agent, or Firm* — Sughrue Mion, PLLC

(57) ABSTRACT

Two open sipes are formed at a tire circumferential direction central side of a block, and closed sipes are formed in the block at both tire circumferential direction sides of the two open sipes. The depth of the open sipes is set in a range of 50 to 70% times the depth of a first circumferential direction main groove, and the depth dimension of the closed sipe is set in a range of 105 to 140% times the depth dimension of the open sipes. Accordingly high performance on ice is obtained while securing block rigidity.

9 Claims, 2 Drawing Sheets

(56) References Cited

U.S. PATENT DOCUMENTS

| | | | |
|---|---|---|---|
| 5,301,727 A * | 4/1994 | Inoue | 152/209.18 |
| 7,950,426 B2 * | 5/2011 | Byrne | 152/209.17 |
| 2009/0044889 A1 * | 2/2009 | Takahashi et al. | 152/209.8 |

FOREIGN PATENT DOCUMENTS

| JP | 06247110 | * | 9/1994 |
|---|---|---|---|
| JP | 07237409 | * | 9/1995 |
| JP | 8-192607 A | | 7/1996 |
| JP | 10-203121 A | | 8/1998 |
| JP | 11-129709 A | | 5/1999 |
| JP | 2002-187413 | * | 7/2002 |
| JP | 2003-118320 A | | 4/2003 |
| JP | 2005-271792 | * | 10/2005 |
| JP | 2005-271792 A | | 10/2005 |
| JP | 2006-103464 A | | 4/2006 |
| JP | 2006-160158 A | | 6/2006 |
| JP | 2007-22277 | * | 2/2007 |
| JP | 2008-62749 | * | 3/2008 |
| JP | 2008-120336 A | | 5/2008 |
| JP | 2008-162298 A | | 7/2008 |
| JP | 2008-221901 A | | 9/2008 |
| JP | 2009-196527 A | | 9/2009 |

OTHER PUBLICATIONS

Machine translation of JP 2008-62749, 2008.*
English translation of JP 2007-22277, 2007.*
Machine translation of JP 07237409, 1995.*
International Search Report for PCT/JP2010/050524, dated Mar. 2, 2010.
Chinese Office Action, dated Feb. 27, 2013, issued in corresponding Chinese Patent Application No. 201080004819.5.
Japanese Office Action, dated Apr. 1, 2014, issued in corresponding Japanese Patent Application No. 2010-547482.
Japanese Office Action issued in Japanese Application No. 2014-104204 dated Mar. 3, 2015 English translation.

* cited by examiner

TIRE

CROSS REFERENCE TO RELATED APPLICATIONS

This application is a National Stage of International Application No. PCT/JP2010/050524 filed on Jan. 19, 2010, which claims priority from Japanese Patent Application No. 2009-010116, filed on Jan. 20, 2009, the contents of all of which are incorporated herein by reference in their entirety.

TECHNICAL FIELD

The present invention relates to a tire, and in particular to a tire with excellent performance on ice and snow.

BACKGROUND ART

There are various proposals for tires with high running performance on icy and snowy roads, called studless tires. Studless tires are configured with block patterned tread patterns in order to obtain high performance on snow, with plural sipes formed in the blocks to obtain performance on ice.

Such studless tires include, for example, those disclosed in Japanese Patent Application Laid-Open (JP-A) Nos. 2006-160158 and 2008-221901.

DISCLOSURE OF INVENTION

Technical Problem

The performance on ice is raised when the length and/or number of sipes is increased in order to further enhance performance on ice and snow, however issues arise with respect to shortening the lifespan and an increase in uneven wear amounts due to block rigidity dropping.

The present invention addresses the above issues and is directed towards provision of a tire capable of obtaining high performance on ice while securing block rigidity.

Solution to Problem

The present invention is made in consideration of the above circumstances, and a tire of a first aspect of the present invention is a tire including: plural blocks provided to a tread; an open sipe provided in each of the blocks, extending along a tire width direction and connected to both tire width direction ends of the block; and closed sipes disposed in each of the blocks at both tire circumferential direction sides of the open sipe, extending in the tire width direction and ending within the block, with the closed sipes formed with a depth that is deeper than the open sipe.

Explanation follows regarding operation of the tire of the first aspect.

In order to obtain performance on ice and performance on snow a blocks need to be formed on the tread, with sipes formed in the blocks extending along the tire width direction. In order to raise performance on ice, since the edge effect of the sipes is required, basically plural sipes with large edge components, namely open sipes, are formed in the blocks. However there is a limit to the amount by which the number of open sipes can be increased since there is an excessive drop in block rigidity when the number of open sipes is too great, leading to a shortening of lifespan and an increase in the amount of uneven wear.

In the tire of the first aspect, the edge component of the sipes is increased and high performance on ice is obtained due to providing closed sipes on both tire circumferential direction sides of the open sipe, with the depth of the closed sipes being deeper than that of the open sipes. Since the closed sipes less readily cause a fall in block rigidity than open sipes, sufficient block rigidity can be secured even though the closed sipes are provide on both tire circumferential direction sides of the open sipes. Were open sipes to be provided on both sides of the open sipes rather than the closed sipes (namely a configuration in which all the sipes are open sipes) there would be concern of block chunking due to large input force and sliding at the two tire circumferential direction ends of the blocks.

A tire of a second aspect of the present invention is a tire of the first aspect, wherein the depth dimension of the open sipes is set in the range of 50 to 70% times the height dimension of the blocks; and the depth dimension of the closed sipes is set in the range of 105 to 140% times the depth dimension of the open sipes.

Explanation follows regarding operation of the tire of the second aspect.

High performance on ice can be obtained with certainty by setting the depth dimension of the closed sipes at 105 to 140% times the depth dimension of the open sipes. When the depth dimension of the closed sipes is less than 105% times the depth dimension of the open sipes a loss of pliability of the blocks results (namely the blocks become hard) leading to lack of certainty that high performance on ice can be obtained. However, when the depth dimension of the closed sipes exceeds 140% times the depth dimension of the open sipes then block rigidity falls, leading to concerns regarding deterioration in uneven wear performance.

A the depth dimension of the open sipes less than 50% of the height of the blocks leads to the possibility of open sipes being extinguished beyond an intermediate wear stage. However, a depth dimension of the open sipes exceeding 70% of the height dimension of the blocks leads to concern that block rigidity cannot be secured. There is also concern regarding cracks developing from the bottoms of the open sipes, leading to block chunking. Since closed sipes are less susceptible to cracks developing from the sipe bottoms even when there are deeper than the open sipes, and accordingly block chunking can be suppressed. Block pliability on ice and snow is increased by making the depth of the closed sipes deep, enabling the performance on ice and snow to be enhanced.

A tire of a third aspect of the present invention is the tire of the first or the second aspect, wherein the closed sipes extend in a zigzag shape along the tire width direction.

Explanation follows regarding operation of a tire of the third aspect.

The edge component is increased by forming the closed sipes in a zigzag shape, and the performance on ice can be enhanced.

A tire of a fourth aspect of the present invention is the tire of one of the first to the third aspects, wherein: two open sipes are formed in a tire circumferential direction central portion of each of the blocks, segmenting the block into a small block portion configured between the two open sipes, and large block portions configured at the two tire circumferential direction outsides of the small block portion, the large block portions being longer in tire circumferential direction length than the small block portion; and the closed sipes are formed in the large block portions.

Configuration in this manner results in the two open sipes being formed in the tire circumferential direction central portion of each of the blocks, and the block being segment into three in the tire circumferential direction. However, collapsing of the small block portion can be suppressed, and a fall in block rigidity can be suppressed by setting the small block portion configured between the two open sipes with a shorter tire circumferential direction length, and the large block portions on the two tire circumferential direction outsides of the small block portion with a longer tire circumferential direction length.

The edge effect can be obtained while still maintaining rigidity of the large block portion due to also forming closed sipes in the large block portions.

A tire of a fifth aspect of the present invention is the tire of any one of the first to the third aspects further including a connecting portion provided in a lug groove disposed between adjacent blocks in the tire circumferential direction, the connecting portion having a height lower than the blocks and connecting together the block on one tire circumferential direction side with the block on the other tire circumferential direction side.

Explanation follows regarding operation of the tire of the firth aspect.

The blocks can be suppressed from collapsing in the tire circumferential direction and performance on ice and snow can be enhanced by providing the connecting portion in the lug groove disposed between adjacent blocks in the tire circumferential direction of a height lower than the blocks and connecting together the block on one tire circumferential direction side with the block on the other tire circumferential direction side.

The tire of the sixth aspect of the present invention is the tire of the fifth aspect wherein a sipe is formed in the connecting portion extending along the tire width direction. Explanation follows regarding operation of the tire of the sixth aspect.

When the blocks wear and the connecting portions make contact with the ground surface from the intermediate wear stage onwards, the sipes provided in the connecting portions make contact with the ground surface, and performance on ice can accordingly be enhanced by the edge effect of these sipes.

A tire of a seventh aspect is the tire of the fifth or the sixth aspect, wherein the tire width direction length of the connecting portion is shorter than the tire width direction length of the adjacent portion in the blocks.

Explanation follows regarding operation of the seventh aspect.

The edge component of the lug grooves can be displayed, and the performance on ice can be enhanced by making the tire width direction length of the connecting portion shorter than the tire width direction length of the adjacent portions of the blocks.

Advantageous Effects of the Invention

By configuring the tire of the present invention as explained above an advantageous effect can be obtained of enabling high performance on ice to be obtained while securing block rigidity.

DESCRIPTION OF EMBODIMENTS

Figure 1:
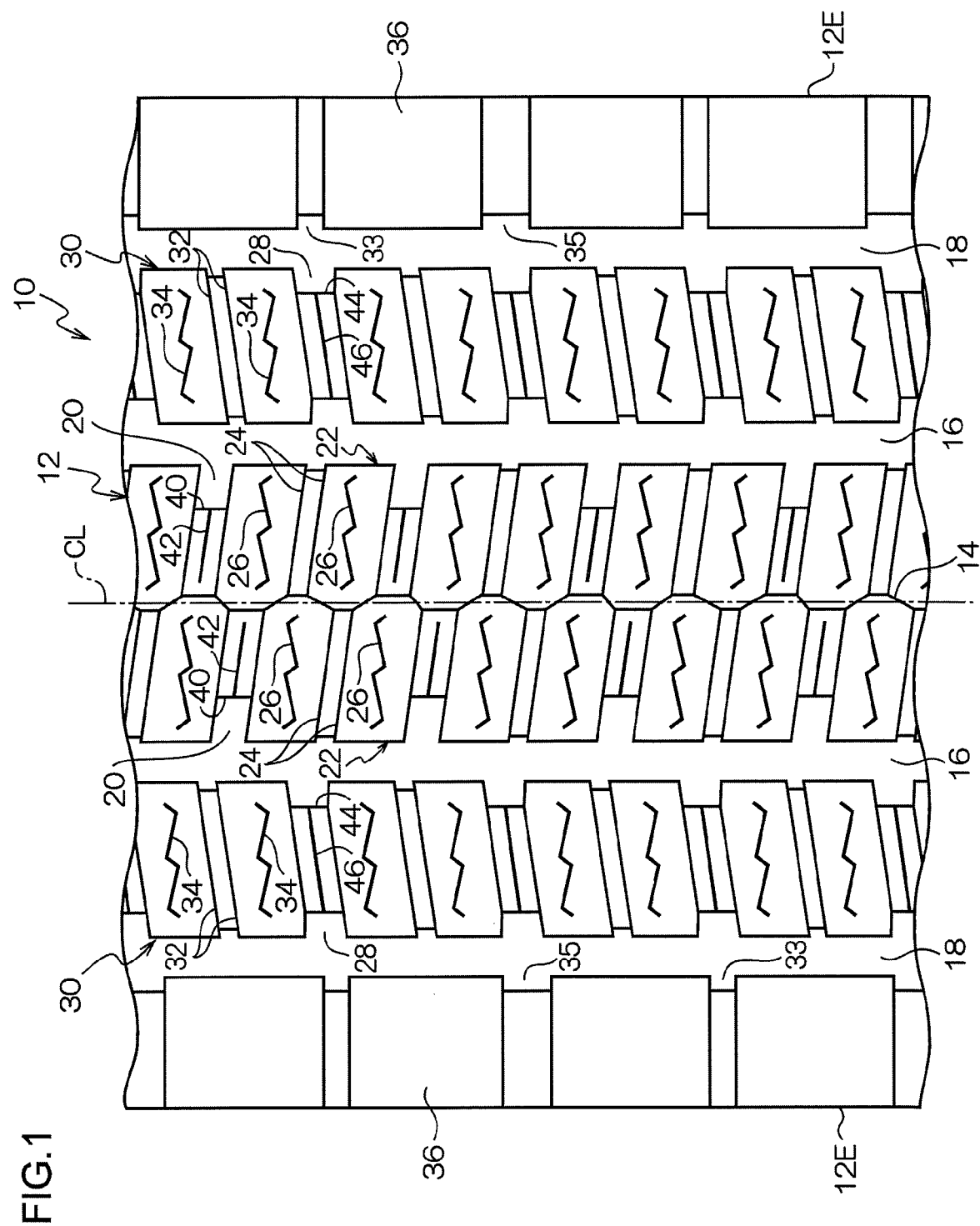
FIG. 1 is a plan view of a tread of a pneumatic tire according to an exemplary embodiment of the present invention.

Explanation follows regarding an exemplary embodiment of a tire of the present invention, with reference to FIG. 1. As shown in FIG. 1, a pneumatic tire 10 of the present exemplary embodiment has a circumferential direction sipe 14 extending in a zigzag shape along the tire center line CL formed in a tire width direction central portion of a tread 12, with first circumferential direction main grooves 16 formed extending in the circumferential direction at both sides of the tire center line CL. Second circumferential direction main grooves 18 are formed extending along the circumferential direction at the tire width direction outside of the first circumferential direction main grooves 16. In the present exemplary embodiment the first circumferential direction main grooves 16 and the second circumferential direction main grooves 18 have the same groove depth.

Along the tire circumferential direction of the land portion sandwiched between the pair of first circumferential direction main grooves 16 there are plural first lug grooves 20 formed connecting together the first circumferential direction main grooves 16 and the circumferential direction sipe 14. The first lug groove 20 formed on the left hand side of the tire center line CL and the first lug groove 20 formed on the right hand side of the tire center line CL are formed so as to be displaced relative to each other in the tire circumferential direction and not aligned with each other along the tire width direction.

The land portions bounded by the first circumferential direction main grooves 16, the first lug grooves 20 and the circumferential direction sipe 14 are in the present exemplary embodiment referred to below as center blocks 22.

Figure 2:
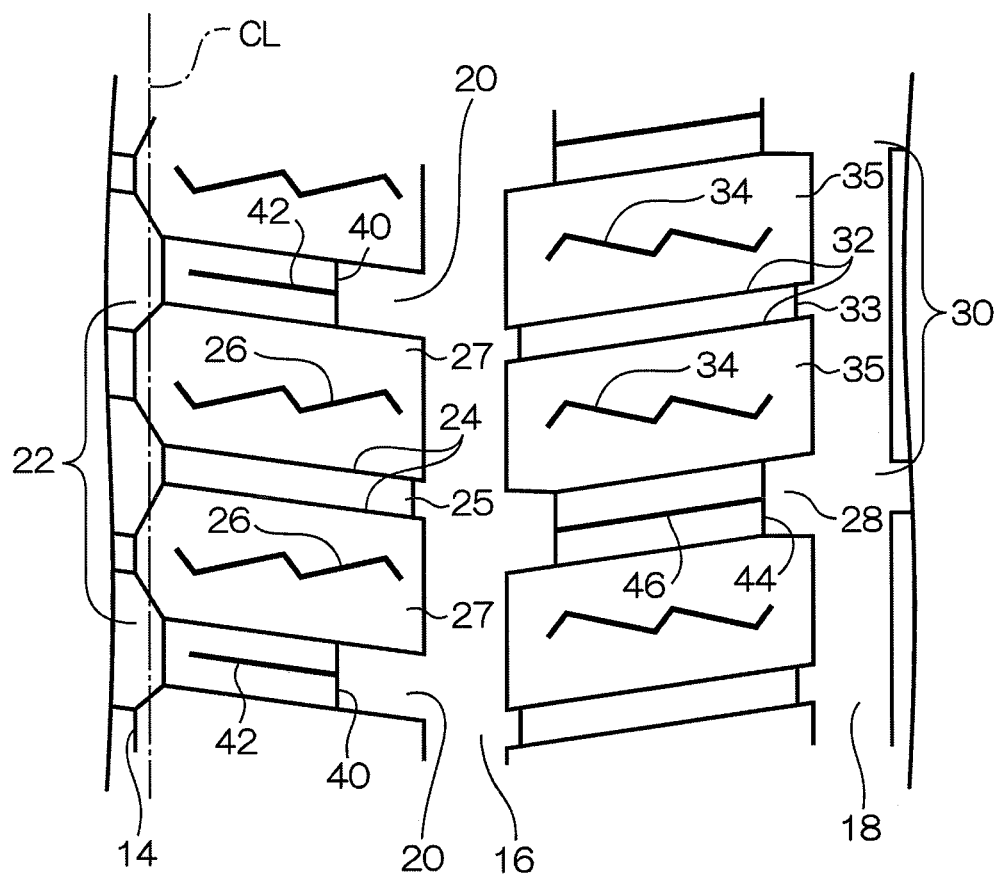
FIG. 2 is a partial enlarged perspective view of a tread of a pneumatic tire according to an exemplary embodiment of the present invention.

Each of the center blocks 22 is configured with two open sipes 24 that are comparatively close together and cut across along the tire width direction at the tire circumferential direction center side of the center block 22. As shown in FIG. 2, the two open sipes 24 segment each of the center blocks 22 into three portions, thereby forming a small block portion 25 of the portion configured between the two open sipes 24, and large block portions 27 of the portions configured at the two tire circumferential direction outsides of the small block portion 25. The tire circumferential direction length of the small block portion 25 is shorter than the tire circumferential direction length of the large block portions 27. A closed sipe 26 is formed in each of the large block portions 27 so as not to completely cut across the tire width direction of the center blocks 22. Namely, the closed sipes 26 are formed on both sides of the open sipes 24 in the tire circumferential direction.

In the present exemplary embodiment the open sipes 24 extend in a straight line along the tire width direction, and the closed sipes 26 extend in a zigzag shape along the tire width direction. However, configuration may be made such that the open sipes 24 extend in a zigzag shape along the tire width direction and the closed sipes 26 extend in a straight line along the tire width direction.

There are two of the open sipes 24 formed in each of the center blocks 22 in the present exemplary embodiment, however configuration may be made with a single open sipe 24 formed in each of the center blocks 22.

The groove depth of the open sipes 24 sectioning the center blocks 22 is preferably set in the range of 50 to 70% of the groove depth of the first circumferential direction main grooves 16.

The closed sipe 26 is formed deeper than the open sipes 24, and the depth dimension of the closed sipe 26 is set in the range of 105% to 140% of the depth dimension of the open sipes 24.

As shown in FIG. 1, along the tire circumferential direction the land portions sandwiched between the first circumferential direction main grooves 16 and the second circumferential direction main grooves 18 are formed with plural second lug grooves 28 connecting together the respective first circumferential direction main grooves 16 and the respective second circumferential direction main grooves 18.

The land portions bounded by the first circumferential direction main grooves 16, the second circumferential direction main grooves 18 and the second lug grooves 28 are referred to below in the present exemplary embodiment as second blocks 30.

The second blocks 30 are also formed with open sipes 32 and closed sipes 34, similar to the open sipes 24 and the closed sipe 26 of the center blocks 22. As shown in FIG. 2, the two open sipes 32 segment each of the second blocks 30 into three portions, so as to form a small block portion 33 of the portion configured between the two open sipes 32, and large block portions 35 of the portions configured on both tire circumferential direction outsides of the small block portion 33. The tire circumferential direction length of the small block portion 33 is shorter than the tire circumferential direction length of the small block portion 25. The closed sipes 34 are formed in each of the respective large block portions 35 so as not to completely cut across the second blocks 30 in the tire width direction. Namely the closed sipes 34 are formed at both tire circumferential direction sides of the two open sipes 32.

The open sipes 32 extend in straight lines along the tire width direction, and the closed sipes 34 extend in zigzag shapes along the tire width direction, however configuration may also be made here with the open sipes 32 extending in zigzags along the tire width direction and the closed sipes 34 extending in straight lines along the tire width direction. Configuration may be made with only a single open sipe 32 in each of the second blocks 30.

In the land portions disposed at the tire width direction outside of the second circumferential direction main grooves 18 there are third lug grooves 33 projecting out from the second circumferential direction main grooves 18 to the outside of the tread edges 12E, and fourth lug grooves 35 of wider width than the third lug grooves 33. The third lug grooves 33 and the fourth lug grooves 35 are disposed alternately to each other around the tire circumferential direction.

The land portions segmented by the second circumferential direction main grooves 18, the third lug grooves 33 and the fourth lug grooves 35 are referred to below in the present exemplary embodiment as shoulder blocks 36.

A first connecting portion 40 is provided in each of the first lug grooves 20 connecting together circumferential direction neighboring center blocks 22. A sipe 42 is formed in a tire circumferential direction central portion of each of the first connecting portions 40, extending parallel to the first lug grooves 20. The first connecting portion 40 is formed lower than the center blocks 22, and, for example, is formed so as to make contact with the road surface at an intermediate wear stage. The tire width direction length of the first connecting portions 40 is shorter than the tire width direction length of the portions in the adjacent large block portions 27, and the first connecting portions 40 are formed on the circumferential direction sipe 14 side of the large block portions 27.

Similar to the first connecting portion 40 formed to each of the first lug grooves 20, a second connecting portion 44 is also formed in each of the second lug grooves 28, and a sipe 46 is also formed in each of the second connecting portions 44.

The second connecting portion 44 is provided at the tire width direction center of the second lug grooves 28, connecting together the circumferential direction adjacent second blocks 30. A sipe 46 extending parallel to the second lug grooves 28 is also formed to a tire circumferential direction central portion of the second connecting portion 44. The second connecting portions 44 are formed lower than the second blocks 30, and, for example, is formed so as to make contact with the road surface at an intermediate wear stage. The tire width direction length of the second connecting portion 44 is shorter than the tire width direction length of portions of the adjacent large block portions 35.

For the center blocks 22 and the second blocks 30, the block width (dimension in the tire width direction) is preferably set at a ratio in the range of 0.10 to 0.20 times the ground contact width. For the center blocks 22 and the second blocks 30, the block length (dimension in the tire circumferential direction) is preferably set at a ratio in the range of 1.0 to 2.0 times the block width.

The ground contact width referred to here is the width of the ground contact shape measured along tire axis direction when the pneumatic tire is mounted to a standard rim, as defined in the JATMA YEAR BOOK (2008 edition, Japan Automobile Tire Manufacturers Association standards), inflated to an internal pressure of 100% of the pressure (maximum pressure) corresponding to maximum load (load shown in bold type in the internal pressure-load chart) in the JATMA YEAR BOOK for the applicable size/ply rating, placed in a stationary state with the rotation axis parallel to the horizontal plane and applied with the maximum load.

Where the location of use or manufacturing location use TRA standards or ETRTO standards, then accordance is made to the respective standard.

Operation

In the pneumatic tire 10 of the present exemplary embodiment, the closed sipe 26, 34 are provided with a deeper groove depth than the open sipes 24, open sipes 32 in the center blocks 22 and the second blocks 30 on the two tire circumferential direction outsides of the open sipes 24, 32. The edge component of the sipe is accordingly increased, thereby obtaining high performance on ice.

Due to the closed sipes 26, 34 being less prone to reducing block rigidity than the open sipes 24, 32, sufficient block rigidity can be secured even when the closed sipes 26, 34 are provided on the two tire circumferential direction outsides of the open sipes 24, 32.

The small block portions 25 configured between two of the open sipes 24 are sandwiched in the tire circumferential direction by the large block portions 27 that are longer in the tire circumferential direction length than the small block portion 25, suppressing the small block portion 25 from collapsing, such that a drop in the rigidity of the center blocks 22 can be suppressed. Similarly with the third lug grooves 33 configured between two of the open sipes 32, due to the third lug grooves 33 also being sandwiched in the tire circumferential direction by the large block portions 35 that are longer in the tire circumferential direction than the third lug grooves 33, the third lug grooves 33 are suppressed from collapsing, such that a drop in the rigidity of the second blocks 30 can be suppressed.

In the present exemplary embodiment the first connecting portions 40 are also provided to the first lug grooves 20, and the second connecting portions 44 are also provided to the second lug grooves 28, so the center blocks 22 and the second blocks 30 can be suppressed from collapsing in the tire circumferential direction, a drop in the block rigidity can be suppressed, and further enhanced performance on snow and ice can be achieved. The tire width direction length of the first connecting portions 40 is also shorter than the tire width direction length of the adjacent portions of the large block portions 27, and the tire width direction length of the second connecting portion 44 is shorter than the tire width direction length of the adjacent portions of the large block portions 35. The edge component of the first lug grooves 20 and the second lug grooves 28 can hence be displayed. The large block portions 27 and the large block portions 35 are formed long in length in the tire circumferential direction, however due to the closed sipes 26 and the closed sipes 34 being formed respectively therein, the edge effect can be displayed while still maintaining rigidity.

When the tread 12 wears down to an intermediate wear stage, the sipes 42 provided to the first connecting portions 40 and the sipes 46 provided to the second connecting portions 44 make contact with the road surface and the performance on ice can be enhanced due to the edge effect of the sipes 42, 46.

Setting the depth dimension of the closed sipe 26, 34 at less than 105% of the depth dimension of the open sipes 24, 32 results in not being able to ensure high performance on ice. However setting the depth dimension of the closed sipe 26, 34 to exceed 140% of the depth dimension of the open sipes 24, 32 reduces block rigidity, leading to concerns regarding a deterioration in uneven wear performance.

A depth dimension of the open sipes 24, 32 of less than 50% of the height dimension of the blocks gives rise to the possibility of the open sipes 24, 32 being obliterated by wear beyond the intermediate wear stage. However, a depth dimension of the open sipes 24, 32 exceeding 70% of the height dimension of the blocks in which they are formed gives rise to concern that block rigidity can no longer be secured.

Other Exemplary Embodiments

In the above exemplary embodiment there are two open sipes formed at a tire circumferential direction central portion of each block, however configuration may be made with only one open sipe as long a performance on ice can be secured, and configuration may be made with two or more open sipes as long as block rigidity is secured. The number of open sipes is preferably two when viewed from both these perspectives.

In the above exemplary embodiments, the open sipes and the closed sipes extend in the tire width direction, however configuration may be made with them extending inclined to the tire width direction.

In order to raise the block rigidity the open sipes and closed sipes may also be configured with what is referred to as a 3D profile having a zigzag shape in the depth direction or other protrusions and indentations on the sipe wall face.

Example Tests

In order to confirm the effect of the present invention, three types of Example Tires applied with present invention, one type of a Conventional Example Tire, and one type of a Comparative Example Tire are produced, and comparisons performed of performance on ice and block rigidity.

Example Tires 1 to 3: tires having the configuration explained in the above exemplary embodiment, with different ratios for the depths of the open sipes and the depths of the closed sipes.

Comparison Example Tire: a tire having a similar configuration to that of the Example Tires, except that the depth of the open sipes and the closed sipes are set the same as each other.

Conventional Example Tire: a tire having a similar configuration to that of the Example Tires, except for there being no closed sipes provided in the blocks.

Performance on ice is measured by opening the accelerator fully from a traveling state at an initial speed of 10 km/h, measuring the time (acceleration time) until a final speed of 30 km/h is reached, and computing the average acceleration from the initial speed, the final speed and the acceleration time. The evaluation is given as an index with the inverse of the average acceleration of the Conventional Example pneumatic tire set at 100. The higher the value of the index the more excellent the performance on ice (torsion).

For block rigidity the base portion of the block is fixed, a given sheer force (force along the tire circumferential direction) is applied to the road contact face of the block, and the displacement amount of the block road contact face measured. Evaluation is an index with the inverse of the displacement amount of the Conventional Example set at 100. The higher the numerical value the smaller the displacement, indicating that the block rigidity is high.

Test results are as shown in the following Table 1. In the tests index values exceeding 110 are tires with high performance.

TABLE 1

|  | Conventional Example | Comparative Example | Test Example 1 | Test Example 2 | Test Example 3 |
| --- | --- | --- | --- | --- | --- |
| Block Width Ratio | 0.09 | 0.125 | ← | ← | ← |
| Block Length Ratio | 1.4 | 1.19 | ← | ← | ← |
| Sipe Depth Ratio | NA | 1.0 | 1.05 | 1.2 | 1.4 |
| Performance On Ice | 100 | 110 | 114 | 120 | 130 |
| Block Rigidity | 100 | 120 | 117 | 110 | 100 |

It can be seen from the test results that the tires of the Test Examples 1 to 3 applied with the present invention secure high performance on ice while securing block rigidity that is equivalent to or better than that of the Conventional Example.

The invention claimed is:
1. A tire comprising:
a plurality of blocks provided to a tread;
two open sipes are formed in a tire circumferential direction central portion of each of the blocks, segmenting each of the blocks into a small block portion configured between the two open sipes, the small block portion having no sipe, and large block portions configured at the two tire circumferential direction outsides of the small block portion, the large block portions being longer in tire circumferential direction length than the small block portion, the large block portions not separated by an open sipe in the circumferential direction; and a closed sipe disposed in each of the large block portions, each closed sipe extending along an outer surface of the large block portion in the tire width direction and ending within the block, with the closed sipes formed to extend radially inward with a depth that is deeper than the open sipes, wherein a length of the closed sipe extending in the tire width direction is greater than a length of the closed sipe extending in the tire circumferential direction, and wherein a depth dimension of the closed sipes is set to be greaLer than 120% and less than or equal to 140% of a depth dimension of the open sipes.

2. The tire of claim 1, wherein:
the depth dimension of the open sipes is set in the range of 50 to 70% times the height dimension of the blocks.

3. The tire of claim 1, wherein:
the closed sipes extend in a zigzag shape along the tire width direction.

4. The tire of claim 1, further comprising a connecting portion provided in a lug groove disposed between adjacent blocks in the tire circumferential direction, the connecting portion having a height lower than the blocks and connecting together the block on one tire circumferential direction side with the block on the other tire circumferential direction side.

5. The tire of claim 4, wherein a sipe is formed in the connecting portion extending along the tire width direction.

6. The tire of claim 4, wherein the tire width direction length of the connecting portion is shorter than the tire width direction length of the adjacent portion in the blocks.

7. The tire of claim 1, wherein a block group comprises two adjacent large block portions and a small block portion provided between the adjacent two large block portions, and wherein the tire further comprises a connecting portion provided between adjacent block groups and the connecting portion comprises a sipe.

8. A tire comprising:
a plurality of blocks provided to a tread;
two open sipes are formed in a tire circumferential direction central portion of each of the blocks, segmenting each of the blocks into a small block portion configured between the two open sipes, the small block portion having no sipe, and large block portions configured at the two tire circumferential direction outsides of the small block portion, the large block portions being longer in tire circumferential direction length than the small block portion, the large block portions not separated by an open sipe in the circumferential direction; and a closed sipe disposed in each of the large block portions, each closed sipe extending along an outer surface of the large block portion in the tire width direction and ending within the block, with the closed sipes formed to extend radially inward with a depth that is deeper than the open sipes, wherein a length of each of the large block portions in the tire width direction is greater than that of the small block portion, and wherein a depth dimension of the closed sipes is set to be greater than 120% and less than or equal to 140% of a depth dimension of the open sipes.

9. The tire of claim 8, wherein a block group comprises adjacent large block portions and a small block portion provided between the adjacent two large block portions, and wherein the tire further comprises a connecting portion provided between adjacent block groups and the connecting portion comprises a sipe.

* * * * *